Jan. 6, 1925.

V. HACKETT 1,521,683

AUTOMATIC CLUTCH RELEASING DEVICE

Filed July 21, 1922 2 Sheets-Sheet 1

Vernon Hackett
INVENTOR

Victor J. Evans
ATTORNEY

WITNESS:

Jan. 6, 1925.
1,521,683
V. HACKETT
AUTOMATIC CLUTCH RELEASING DEVICE
Filed July 21, 1922    2 Sheets-Sheet 2

Patented Jan. 6, 1925.

1,521,683

UNITED STATES PATENT OFFICE.

VERNON HACKETT, OF OSSEO, MICHIGAN.

AUTOMATIC CLUTCH-RELEASING DEVICE.

Application filed July 21, 1922. Serial No. 576,606.

*To all whom it may concern:*

Be it known that I, VERNON HACKETT, a citizen of the United States, residing at Osseo, in the county of Hillsdale and State of Michigan, have invented new and useful Improvements in Automatic Clutch-Releasing Devices, of which the following is a specification.

This invention relates to an automatic clutch releasing device for farm tractors, and the object is to prevent the overturning of the tractor rearwardly, under well known conditions in which an accident of this kind is liable to occur.

A further object is to provide a particular arrangement of levers, one of which contacts with the surface of the ground, either directly or through an adjustable foot member,—when the forward portion of the tractor rises, the extent of movement of the lever first acted upon being increased to a sufficient extent to render positive the operation of the clutch lever or pedal and throw out the clutch for the purpose indicated.

A further object is to provide an element pivotally mounted at the rear of the tractor, and toward one side, in order that it may not interfere with the various uses of the tractor, this element specified being of channel formation and having mounted therein a plurality of levers, so connected that a limited movement imparted to the element first named will be magnified to the required extent.

With the foregoing and other objects in view, the invention consists in the novel construction and arrangement of elements described and claimed, it being understood that modifications may be made within the scope of the claim, without departing from the spirit of invention.

Figure 1:
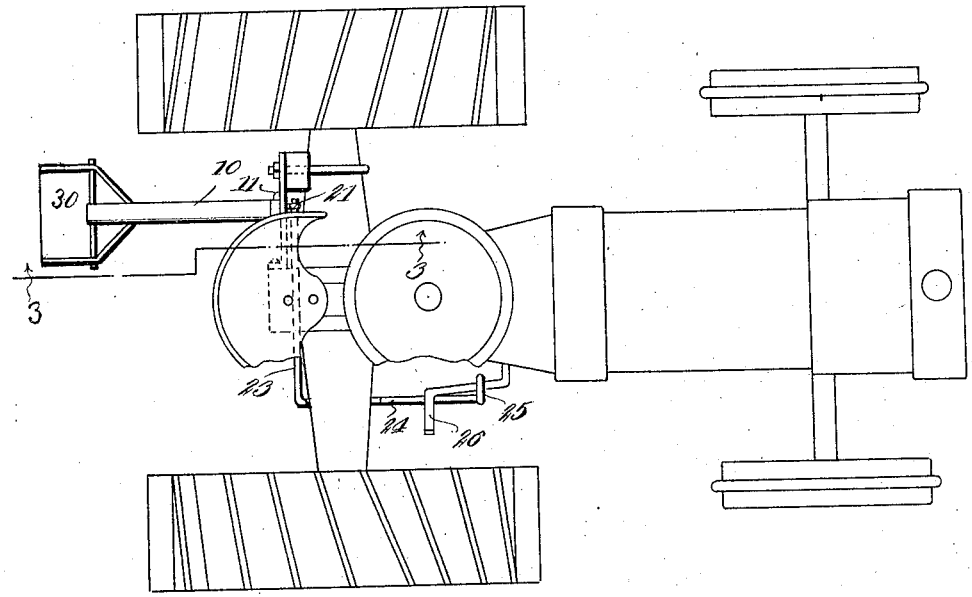
Figure 2:
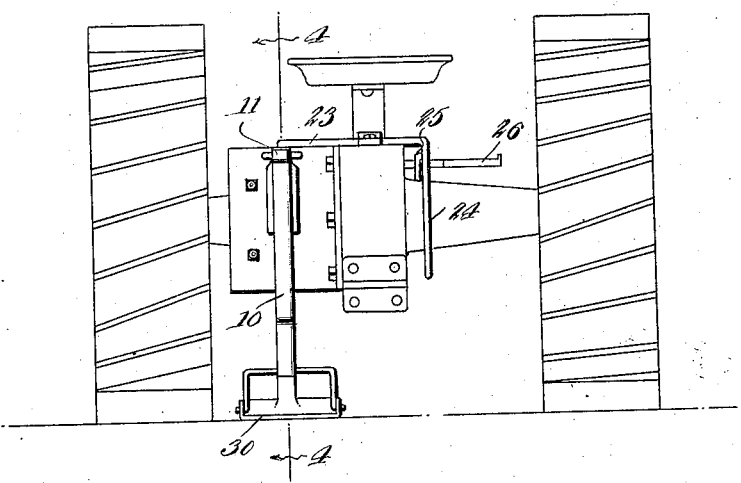
Figure 3:
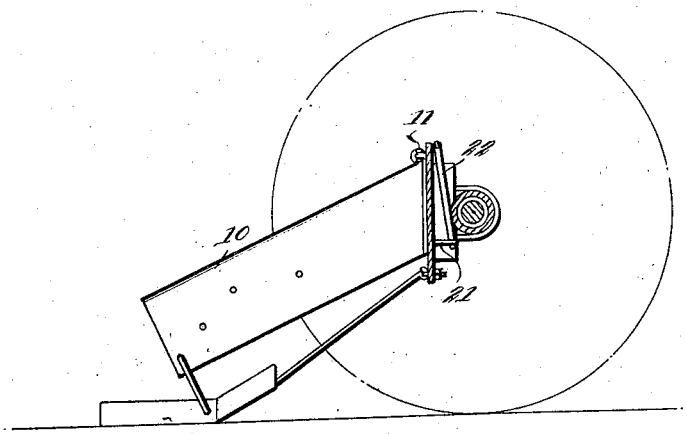
Figure 5:
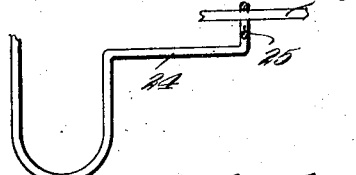
Figure 4:
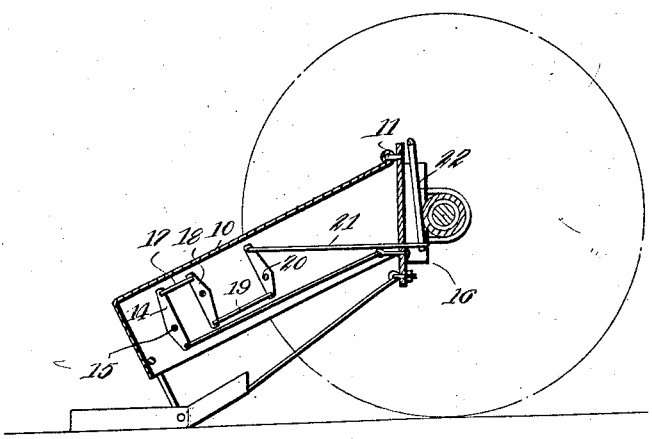

In the drawings, Figure 1 is a top plan view showing the manner of applying the device to a tractor; Figure 2 is a rear elevation; Figure 3 is a view on line 3—3 of Figure 1; Figure 4 is a vertical longitudinal section, approximately on line 4—4 of Figures 1 and 2; Figure 5 is a side view of the element 24 of Figure 1, for transmitting movement to clutch lever 26.

In carrying out the invention, I provide a principal lever 10, this lever being in the first instance of channel formation, and being pivoted at 11, where a form of hinge connection is provided, in order that the member 10 may move about a horizontal axis.

Within the channel element is a lever 14 pivoted at 15. This lever is provided with an aperture near its lower end, and a connecting rod or rods pivoted to the lower end portion of the lever has permanent connection at 16 with a stationary element, so that upon the elevation of the rear portion of lever 10, the lever 14 moves about the axis 15.

The upper arm of lever 14 is longer than the lower arm, and connected with this upper end is a short rod 17 which is also connected with the short arm of lever 18. The lower and longer arm of lever 18 is connected by rod 19 with the shorter arm of lever 20, and the longer arm of the lever last named is connected by rod 21 with a crank element 22 formed on or connected with the horizontal rotatable element 23 which for convenience will be termed a shaft. Formed on or connected with the opposite end of this shaft is a crank element 24 carrying an offset slotted element 25. The clutch lever or pedal 26 passes through the slot of the element just referred to, and this element 26 is movable to operative position, under usual and ordinary conditions, without actuating the series of levers above described.

In the event that the element 10, or an adjustable foot member connected therewith, comes into contact with the surface of the ground, due to the elevation of the forward portion of the tractor, movement is imparted through the series of levers, the crank element 22 is actuated, the horizontal shaft 23 rotated, and downward movement is imparted to element 25 and the clutch lever 26, for the purpose of throwing out a clutch.

Having thus described the invention, I claim:

In a device of the class described, a lever of channel formation to be pivotally mounted at the rear of a tractor or the like, with its outer end extending downwardly for contact with the surface of the ground, the lever being movable about a horizontal axis, a series of levers mounted within the channel member and connected therewith for operation upon the upward movement of the lower end of said channel member, a rock shaft, means for imparting movement thereto upon the operation of the series of levers, a clutch lever, and means for imparting movement thereto upon the movement of the rock shaft.

In testimony whereof I affix my signature.

VERNON HACKETT.